United States Patent
Hasuka et al.

(10) Patent No.: US 6,973,393 B2
(45) Date of Patent: Dec. 6, 2005

(54) CONTROL APPARATUS FOR A FUEL CELL VEHICLE

(75) Inventors: Yoshinobu Hasuka, Utsunomiya (JP); Hibiki Saeki, Utsunomiya (JP); Satoshi Aoyagi, Wako (JP); Shinji Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 10/723,935

(22) Filed: Nov. 26, 2003

(65) Prior Publication Data

US 2004/0204874 A1  Oct. 14, 2004

(30) Foreign Application Priority Data

Nov. 29, 2002 (JP) .......................... P2002-347666

(51) Int. Cl.⁷ .......................... G01R 31/36; H01M 8/00
(52) U.S. Cl. .......................................... 702/63; 429/12
(58) Field of Search .................. 702/63; 429/121, 429/12, 62; 701/22

(56) References Cited

U.S. PATENT DOCUMENTS

| | | | |
|---|---|---|---|
| 6,321,145 B1 * | 11/2001 | Rajashekara | 701/22 |
| 6,458,478 B1 * | 10/2002 | Wang et al. | 429/17 |
| 6,744,237 B2 * | 6/2004 | Kopf et al. | 320/104 |
| 2003/0139859 A1 * | 7/2003 | Hanada et al. | 701/22 |
| 2004/0015255 A1 * | 1/2004 | Davis | 700/97 |

FOREIGN PATENT DOCUMENTS

JP  2001-357865  12/2001

OTHER PUBLICATIONS

Gao et al., Systematic Design of Fuel Cell Powered Hybrid Vehicle Drive Train, 2001 IEEE, pp. 604-611.*

Francesco et al., Start-Up Analysis for Automotive PEM Fuel Cell Systems, Jun. 1 2002, Journal of Power Sources, vol. 108, Issue 1-2, pp. 41-52.*

YuWen et al., Performance Optimization Control of the Fuel Cells Electric Vehicle Driving System, 2002 IEEE, pp. 149-152.*

Kumar et al., Fuel Cell for Vehicle Propulsion Applications: A Thermodynamic Systems Analysis, 1989 IEEE, pp. 1601-1606.*

* cited by examiner

*Primary Examiner*—Bryan Bui
*Assistant Examiner*—Toan M. Le
(74) *Attorney, Agent, or Firm*—Lahive & Cockfield, LLP; Anthony A. Laurentano, Esq.

(57) ABSTRACT

A control apparatus calculates the capacitor maximum power ($P_{CAPU}$) that can be supplied to a capacitor depending on the detected value of the temperature of the capacitor, and calculates the output power ($P_{FC}$) of the fuel cell, the real power of the motor ($P_{MOT}$) that actually powers the drive motor, and the load power ($P_{AC}$) that actually powers an electrical load, excluding the drive motor. The control apparatus calculates the motor power limiting value ($P_{MOTU}$), which is the motor power that corresponds to the capacitor maximum power ($P_{CAPU}$), based on the output power ($P_{FC}$) of the fuel cell, the load power ($P_{AC}$) that powers the electrical load, excluding the drive motor, and the capacitor maximum power ($P_{CAPU}$). The control apparatus output to the output controller a control command that directs the real power of the motor ($P_{MOT}$) to take the value of the motor power limiting value ($P_{MOTU}$) in the case that the real power of the motor ($P_{MOT}$) is larger than the motor power limiting value ($P_{MOTU}$). The drivability of a fuel cell vehicle is improved while protecting the capacitor.

19 Claims, 3 Drawing Sheets

CONTROL APPARATUS FOR A FUEL CELL VEHICLE

BACKGROUND OF THE INVENTION

1. Field of the Invention

The present invention relates to a control apparatus for a fuel cell vehicle.

2. Description of the Related Art

Conventionally, for example, a solid polymer membrane fuel cell is provided with a stack constructed by stacking a plurality of cells, where a cell is formed by sandwiching a solid polymer electrolyte membrane between a fuel electrode (anode) and an oxygen electrode (cathode). Hydrogen is supplied as the fuel to the fuel electrode and air is supplied to the oxygen electrode as the oxidizing agent, and hydrogen ions generated by the catalytic reaction at the fuel electrode migrate to the oxygen electrode by passing through the solid polymer catalytic membrane and cause an electrochemical reaction with the oxygen at the oxygen electrode to generate electricity.

In addition, as a fuel cell vehicle having such a fuel cell mounted as a drive power source, a fuel cell vehicle is conventionally known that is provided with capacitors made of, for example, an electric double layer capacitor, an electrolytic capacitor, or the like, and carries out the transfer of electrical energy with the drive motor while accumulating the energy generated by the fuel cell (for example, Japanese Unexamined Patent Application, First Publication, No. 2001-357865).

In this type of fuel cell vehicle, the capacitor is connected in parallel to the fuel cell via an output controller that controls the output current and the output voltage of the fuel cell, and the operation of the output control is controlled depending on, for example, the condition of the fuel cell vehicle, the fuel cell, the capacitor, or the like. An example of the operation of the output control is the chopping operation of the output controller constructed by having a chopper-type power inverter circuit.

However, in the fuel cell vehicle according to this one example of the conventional technology described above, a predetermined rated current is set for the charged current and the discharged current of the capacitor depending on the temperature of the capacitor, and the drive and regeneration of the drive motor is controlled such that a current that exceeds the rated current does not power the drive motor.

However, when the drive and regeneration of the drive motor is controlled simply depending on the rated current of the capacitor, there are cases in which the current that powers the drive motor is excessively limited, and there is a concern that the drivability of the fuel cell vehicle will deteriorate.

In consideration of the problems described above, it is an object of the present invention to provide a control apparatus for a fuel cell vehicle that can improve the drivability of the fuel cell vehicle while protecting the capacitor.

SUMMARY OF THE INVENTION

In order to attain the above object, according to the present invention, there is provided a control apparatus for a fuel cell vehicle including a drive motor that can drive the vehicle; a fuel cell that is supplied a reacting gas that undergoes an electrochemical reaction to generate electricity; a capacitor that is charged by a generated power of the fuel cell and regeneration power of the drive motor; a reacting gas supply means that supplies the reacting gas to the fuel cell; and an output control means that controls an output current and output voltage of the fuel cell, comprising: a capacitor temperature detecting means that detects temperature of the capacitor; a maximum power setting means that sets a capacitor maximum power, which is a maximum value of the power for charging and discharging the capacitor, depending on the temperature of the capacitor; a motor power limiting value calculating means that calculates a motor power limiting value for a drive and regenerative motor power of the drive motor based on each of detected values of an output power of the fuel cell and a load power supplied to a load, excluding the drive motor, and the capacitor maximum power; a motor real power detecting means that detects a real power of the motor, which is the motor power actually supplied during drive and regeneration of the drive motor; and a motor power control means that controls the real power of the motor such that a detected value of the real power of the motor is equal to or less than the motor power limiting value.

According to the control apparatus for the fuel vehicle having the structure described above, by controlling the real power of the motor based on the output power of the fuel cell and the maximum power of the capacitor, in comparison, for example, to the case of controlling the real power of the motor according to only the maximum power of the capacitor, it is possible to prevent excessive limiting of the real power of the motor and improve the drivability of the fuel cell vehicle while protecting the capacitor.

The above and other objects and features of the present invention will become more apparent from the following description taken in conjunction with the accompanying drawings.

PREFERRED EMBODIMENTS OF THE PRESENT INVENTION

The control apparatus for the fuel cell vehicle according to an embodiment of the present invention will now be described with reference to the drawings.

Figure 1:
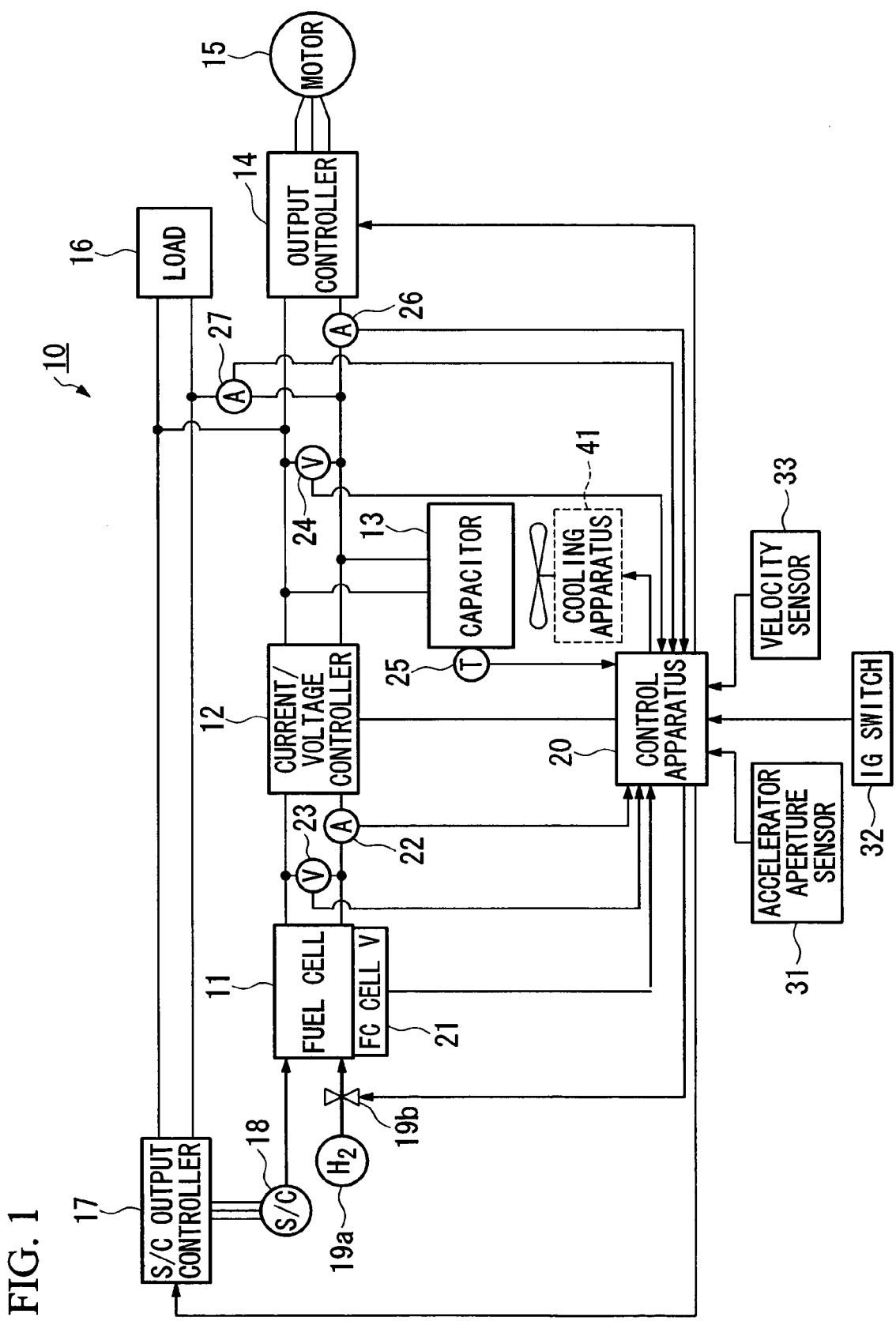
FIG. 1 is a structural diagram of the control apparatus of the fuel cell vehicle according to an embodiment of the present invention.

As shown in FIG. 1, a control apparatus 10 for a fuel cell vehicle according to the present embodiment is provided with a fuel cell 11, a current/voltage controller 12, a capacitor 13, an output controller 14, a drive motor 15, a load 16, an S/C output controller 17, an air compressor (S/C) 18, a hydrogen tank 19a and a hydrogen supply valve 19b, a control apparatus 20, a fuel cell cell voltage sensor 21, an output current sensor 22, an output voltage sensor 23, a capacitor voltage sensor 24, a capacitor temperature sensor 25, a drive motor current sensor 26, an auxiliary device drive current sensor 27, an accelerator aperture sensor 31, an IG switch 32, and a velocity sensor 33.

The fuel cell 11 is constructed by stacking a plurality of fuel cells having an electrolytic electrode structure in which a solid polymer electrolyte membrane made of a cation exchange membrane that is sandwiched between a fuel electrode (anode) consisting of an anode catalyst and a gas diffusion layer, and an oxygen electrode (cathode) consisting of a cathode catalyst and a gas diffusion layer, is further sandwiched between a pair of separators.

To the anode of the fuel cell 11, a fuel gas (reacting gas) consisting of hydrogen is supplied via the hydrogen supply valve 19b from the high pressure hydrogen tank 19a, the hydrogen that is ionized by the catalytic reaction on the anode catalyst of the anode migrates to the cathode via the solid polymer electrolyte membrane that is suitably moistened, and the electrons generated by this migration is extracted by an external circuit and used as direct current electrical energy. To the cathode, for example, the air, which is the oxidizing agent (reacting gas) that includes oxygen, is supplied by the compressor (S/C) 18, and at this cathode, water is generated by a reaction between the hydrogen ions, the electrons, and the oxygen.

The generated current (output current) extracted from the fuel cell 11 is input to the current/voltage controller 12, and the current/voltage controller 12 is connected to the capacitor 13 that is formed by a plurality of capacitor cells made of, for example, an electric double layer capacitor, a electrolytic capacitor, or the like, that are connected to each other in parallel.

In addition, the fuel cell 11, the current/voltage controller 12, and the capacitor 13 are connected in parallel to the drive motor 15 via the output controller 14, the load 16 consisting of, for example, various auxiliary devices such as the cooling apparatus 41 for the capacitor 13 and the fuel cell 11, an air conditioning apparatus (not shown), and the like, and the air compressor (S/C) 18 via the S/C output controller 17.

The current/voltage controller 12 is provided with, for example, a chopper-type power inverter circuit, and the current value of the output current extracted from the fuel cell 11 is controlled, for example, by the chopping operation of the chopper-type power inverter circuit, that is, the ON/OFF operation of the switching element provided in the chopper-type power inverter circuit, and this chopping operation is controlled depending on the duty, that is, the ON/OFF ratio, of the control pulse input from the control apparatus 20.

For example, in the case that the extraction of the output current from the fuel cell 11 is prohibited, when the duty of the control pulse input from the control apparatus 20 is set to 0%, the switching element provided in the chopper-type power inverter circuit is fixed in the OFF state, and the fuel cell 11 and the capacitor 13 are electrically disconnected. In contrast, when the duty of the control pulse is set to 100% and the switching element is fixed in the ON state, the fuel cell 11 and the capacitor 13 are in a connected state, and the output voltage of the fuel cell 11 and the voltage between the terminals of the capacitor 13 have equal values.

In addition, when the duty of the control pulse is set at an appropriate value between 0% and 100%, the current/voltage controller 12 appropriately limits the output current of the fuel cell 11 that serves as the primary current depending on the duty of the control pulse, and outputs this current obtained by this limiting as a secondary current.

The output controller 14 is provided with, for example, a PWM inverter that uses pulse width modulation (PMW), and controls the drive and the regeneration operations of the drive motor 15 depending on a control command output from the control apparatus 20. For example, while driving the drive motor 15, direct current power output from the current/voltage controller 12 and the capacitor 13 is supplied to the drive motor 15 after conversion to a three phase alternating current power based on a torque command input from the control apparatus 20. In contrast, during regeneration of the drive motor 15, the three-phase alternating current power output from the drive motor 15 is supplied to the capacitor 13 after conversion to direct current power, and thereby the capacitor 13 is charged.

Moreover, the drive motor 15 serves as an alternating current three-phase permanent-magnate synchronous motor that uses a permanent magnate as a magnetic field, and the drive thereof is controlled by the three-phase alternating current power supplied from the output controller 14. At the same time, when the drive force is transmitted to the drive motor 15 side from the drive wheel side during deceleration of the vehicle, the drive motor 15 functions as a generator and generates what is termed regenerative breaking power, and the kinetic energy of the vehicle is recovered as electrical energy.

In addition, the air compressor 18 takes in and compresses the air from outside the vehicle, and supplies this air to the cathode of the fuel cell 11 as a reacting gas.

The revolutions of the motor (not shown) that drives the air compressor 18 is controlled by the S/C output controller 17 provided with, for example, the PWM inverter that uses pulse width modulation (PWM), based on a control command input from the control apparatus 20.

The control apparatus 20 outputs a command value for the flow rate of the reacting gases supplied to the fuel cell 11 from the air compressor 18 and a command value for the aperture of the oxygen supply valve 19b based, for example, on the state of operation of the vehicle, the concentration of hydrogen included in the reacting gas supplied to the anode of the fuel cell 11, the concentration of the hydrogen included in the exhaust gas discharged from the anode of the fuel cell 11, the voltage between the terminals of each of the plurality of fuel cell cells, or the output current extracted from the fuel cell 11, and thereby controls the state of the electrical generation of the fuel cell 11.

Then the control apparatus 20 outputs a control pulse that controls the power conversion operation of the current/voltage controller 12 based on the power generation command for the fuel cell 11, and controls the current value of the output current extracted from the fuel cell 11.

In addition, the control apparatus 20 controls the power conversion operation of the PWM inverter provided in the output controller 14, and, for example, during the drive of the drive motor 15, calculates the torque command based on the signal indicating the degree that the accelerator is pressed according to the amount of the pressing action on the accelerator peddle by the driver. Then the control apparatus 20 inputs this torque command to the output controller 14, and thereby the pulse width modulation signal that depends on the torque command is input into the PWM inverter, and each phase of the current for generating the requested torque is output to each phase of the drive motor 15.

Then the control apparatus 20 controls the regeneration operation of the drive motor 15 based, for example, on the detected values of the state of the capacitor 13, for example, its temperature, and the total voltage, which is the sum of the capacitor cell voltages of the plurality of capacitor cells, that is, the voltage between the terminals of the capacitor 13.

Thereby, input into the control apparatus 20 are: the detection signals output from the fuel cell cell voltage sensor 21 that detects the voltage between the terminals of the each of the plurality of fuel cell cells (the fuel cell cell voltage) that constitute the fuel cell 11; the detected signal output from the output current sensor 22 that detects the current value of the output current extracted from the fuel cell 11; the detected signal output from the output voltage censor 23 that detects the output voltage of the fuel cell 11; the detected signal output from the capacitor voltage sensor 24 that detects the voltage between the terminals of the capacitor 13; the detected signal output from the capacitor temperature sensor 25 that detects the temperature of the capacitor 13; the detected signal output from the drive motor current sensor 26 that detects the current that powers the output controller 14; the detected signal output from the auxiliary device drive current sensor 27 that detects the current that powers the load 16 and the S/C output controller 17; the detected signal output from the accelerator aperture sensor 31; the signal output from the IG switch 32 that indicates the start of the operation of the vehicle; and the detected signal output from the velocity sensor 33 that detects the velocity of the vehicle.

Next, as will be described below, the control apparatus 20 calculates the power that can be supplied to the capacitor 13 depending on the detected value of the temperature of the capacitor 13, that is, the capacitor maximum power $P_{CAPU}$ with respect to the charging or discharging of the capacitor 13. Then the control apparatus 20 calculates the output power $P_{FC}$ of the fuel cell 11 based, for example, on each of the detected values of the output current and output voltage of the fuel cell 11. Subsequently, the control apparatus 20 calculates the real power of the motor $P_{MOT}$ that actually powers the drive motor 15 based on each of the detected values of the voltage between the terminals of the capacitor 13 and the current supplied to the output controller 14. Finally, the control apparatus 20 calculates the load power $P_{AC}$ based, for example, on each of the detected values of the voltage between the terminals of the capacitor 13 and the current supplied to the electrical load, excluding the drive motor 15, that is, the load 16, and the S/C output controller 17.

In addition, the control apparatus 20 calculates the motor power limiting value $P_{MOTU}$, which is the motor power that corresponds to the capacitor maximum power $P_{CAPU}$, based on the output power $P_{FC}$ of the fuel cell 11, the load power $P_{AC}$ supplied to the electrical load, excluding the drive motor 15, that is, the load 16, and the S/C output controller 17, and the capacitor maximum power $P_{CAPU}$.

Additionally, in the case that the real power of the motor $P_{MOT}$ is larger than the motor power limiting value $P_{MOTU}$, the control apparatus 20 outputs to the output controller 14 a control command directing that the real power of the motor $M_{MOT}$ be made equal to the motor power limiting value $P_{MOTU}$.

The control apparatus 10 of the fuel cell vehicle according to the present embodiment is provided with the structure described above. Next, the operation of the control apparatus 10 for the fuel cell vehicle will be described with reference to the attached figures.

Figure 2:
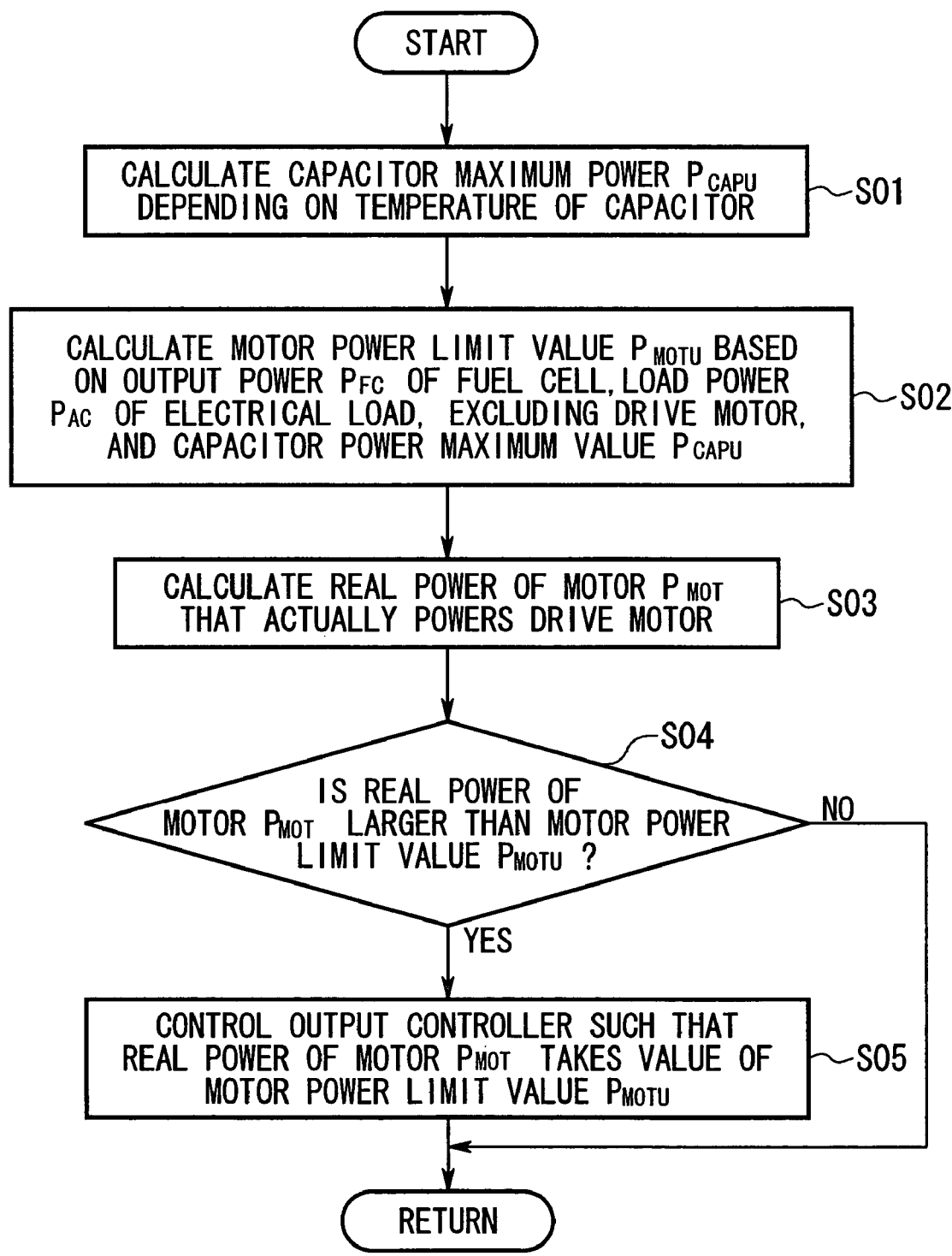
FIG. 2 is a flow chart showing the operation of the control apparatus of the fuel cell vehicle shown in FIG. 1.
Figure 3:
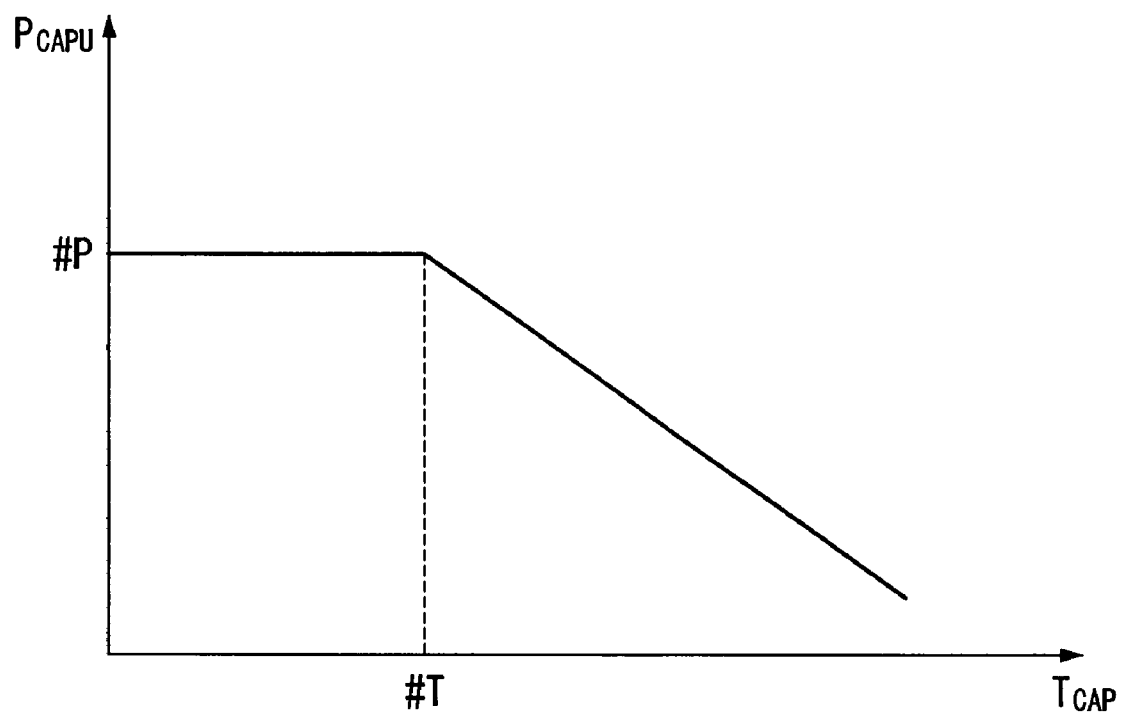
FIG. 3 is a graph showing the maximum electrical power $P_{CAPU}$ that varies depending on the temperature $T_{CAP}$ of the capacitor.

First, for example, in step S 01 shown in FIG. 2, the capacitor maximum power $P_{CAPU}$ is calculated depending on the detected value of the temperature of the capacitor 13. Here, as shown, for example, in FIG. 3, the capacitor maximum power $P_{CAPU}$, which corresponds to the detected value of the temperature of the capacitor 13, is calculated based on a predetermined table of the capacitor maximum power $P_{CAPU}$ that varies depending on the temperature $T_{CAP}$ of the capacitor 13.

Next, in step S 02, the motor power limiting value $P_{MOTU}$, which is the motor power that corresponds to the capacitor maximum power $P_{CAPU}$, is calculated, as shown, for example, in the following equation 1, based on the output power $P_{FC}$ of the fuel cell 11 that is calculated based, for example, on each of the detected values of the output current and the output voltage of the fuel cell 11, and the load power $P_{AC}$ that is calculated based, for example, on each of the detected values of the voltage between the terminals of the capacitor 13 and the current supplied to the electrical load, excluding the drive motor 15, that is, the load 16, and the S/C output controller 17, and the capacitor maximum power $P_{CAPU}$.

$$P_{MOTU}=P_{FC}+P_{CAPU}-P_{AC} \qquad \text{Equation 1}$$

In step S 03, the real power of the motor $P_{MOT}$ that actually powers the drive motor 15 is calculated based, for example, on each of the detected values of the voltage between the terminals of the capacitor 13 and the current supplied to the output controller 14.

Next, in step S 04, whether or not the real power of the motor $P_{MOT}$ is larger than the motor power limiting value $P_{MOTU}$ is determined.

In the case that the result of the determination is NO, the processing sequence ends.

In contrast, in the case that the result of the determination is YES, the processing proceeds to step S 05.

In step S 05, a control command directing that the real power of the motor $P_{MOT}$ be made equal to the motor power limiting value $P_{MOTU}$ is output to the output controller 14, and the processing sequence ends.

As described above, according to the control apparatus 10 for a fuel cell vehicle according to this embodiment, by controlling the real power of the motor $P_{MOT}$ actually supplied to the drive motor 15 based on the output power $P_{FC}$ of the fuel cell 11, the load power $P_{AC}$ supplied to the electrical load, excluding the drive motor 15, and the capacitor maximum power $P_{CAPU}$, in comparison, for example, to controlling the real power of the motor $P_{MOT}$ based on only the capacitor maximum power $P_{CAPU}$, it is possible to prevent the excessive limiting of the real power of the motor $P_{MOT}$, and improve the drivability of the fuel cell vehicle while protecting the capacitor 13.

What is claimed is:

1. A control apparatus for a fuel cell vehicle including a drive motor for driving the vehicle; a fuel cell that is supplied a reacting gas that undergoes an electrochemical reaction to generate electricity; a capacitor that is charged by a generated power of said fuel cell and a regeneration power of said drive motor; a reacting gas supply means that supplies said reacting gas to said fuel cell; and an output control means that controls an output current and an output voltage of said fuel cell, comprising:

a capacitor temperature detecting means that detects a temperature of said capacitor;

a maximum power setting means that sets a capacitor maximum power, which is a maximum value of the power for charging and discharging said capacitor, depending on the temperature of said capacitor;

a motor power limiting value calculating means that calculates a motor power limiting value for a drive and a regenerating motor power of said drive motor based on each of detected values of an output power of said fuel cell and a load power supplied to a load, excluding said drive motor, and said capacitor maximum power;

a motor real power detecting means that detects a real power of the drive motor, which is the motor power actually supplied during drive and regeneration of said drive motor; and a motor power control means that controls said real power of said motor such that a detected value of the real power of said motor is equal to or less than said motor power limiting value.

2. The control apparatus of claim 1, further comprising a capacitor voltage sensor for detecting the output voltage of the capacitor.

3. The control apparatus of claim 1, further comprising a fuel cell voltage sensor for detecting a voltage across the fuel cell.

4. The control apparatus of claim 1, further comprising an output current sensor for detecting an output current of the fuel cell.

5. The control apparatus of claim 1, further comprising a fuel cell output voltage sensor for detecting an output voltage of the fuel cell.

6. The control apparatus of claim 1, further comprising a drive motor current sensor for detecting a current that powers the motor power control means.

7. The control apparatus of claim 1, further comprising an auxiliary device drive current sensor that detects a current that powers the load.

8. The control apparatus of claim 1, further comprising:
an accelerator sensor for detecting an acceleration of the fuel cell vehicle;
a velocity sensor for detecting a velocity of the fuel cell vehicle; and
an IG switch that indicates a start of the operation of the fuel cell vehicle.

9. The control apparatus of claim 1, wherein the motor power control means is connected in parallel to the capacitor.

10. A control apparatus for a fuel cell vehicle, comprising:
a capacitor temperature sensor for detecting a temperature of a capacitor in the fuel cell vehicle;
a maximum power setting module for setting a maximum power value of the capacitor, wherein the maximum power value is a maximum value of the power for charging and discharging said capacitor, depending on the temperature of said capacitor;
a motor power limiting value calculating module for calculating a motor power limiting value for a drive motor of the fuel cell vehicle, which corresponds to the maximum power of the capacitor and a regenerating motor power of the drive motor, which is based on one or more detected values indicative of the state of the capacitor;
a motor real power detecting module for detecting a motor real power of the drive motor, wherein the motor real power is motor power actually supplied during drive and regeneration of said drive motor; and
a motor power control module for controlling said motor real power of said drive motor such that a detected value of the motor real power is equal to or less than said motor power limiting value.

11. The control apparatus of claim 10, wherein the motor power limiting value calculating module calculates the motor power limiting value based on an output power of the fuel cell and a load power supplied to an electrical load, excluding the drive motor and the capacitor maximum power.

12. The control apparatus of claim 10, wherein the motor power limiting value calculating module calculates the regenerating motor power of the drive motor based on the temperature and total voltage of the capacitor.

13. The control apparatus of claim 10, further comprising a control apparatus for outputting to the motor power control module a control command directing the real power of the motor to be made equal to the motor power limiting value when the real power of the motor is larger than the motor power limiting value.

14. A method of controlling a fuel cell, comprising the steps of:
calculating a capacitor maximum power value of a capacitor that is charged by power from the fuel cell;
calculating a motor power limit value for a motor based on an output power of the fuel cell and said capacitor maximum power value;
calculating a real power value of the motor corresponding to an actual amount of power that drives the motor;
comparing the real power value to the motor power limit value; and
adjusting the real power value if the real power value is larger than the motor power limit value
wherein the capacitor maximum power depends on a temperature of the capacitor.

15. The method of claim 14, wherein the step of adjusting comprises outputting a control command to a motor power control module for directing the real power of the motor to be made equal to the motor power limit value.

16. The method of claim 14, wherein the step of adjusting the real power value comprises reducing the real power value to an amount that is equal to or less than said motor power limit value.

17. A method of controlling a fuel cell vehicle including a drive motor for driving the vehicle, a fuel cell that generates electricity from a reacting gas that undergoes an electrochemical reaction, and a capacitor that is charged by at least one of power from said fuel cell and a regeneration power of said drive motor, the method comprising the steps of:
generating power with the fuel cell;
controlling an amount of real power applied to the drive motor based on an amount of the power generated by the fuel cell and a capacitor maximum power value, wherein the capacitor maximum power value is a maximum value of the power for charging and discharging said capacitor; and
setting the capacitor maximum power value based on a temperature of the capacitor.

18. The method of claim 17, further comprising the step of calculating a motor power limit value based on the capacitor maximum power value.

19. The method of claim 18, wherein the step of controlling comprises controlling the amount of real power applied to the drive motor, such that a detected value of the real power is equal to or less than said motor power limit value.

* * * * *